Oct. 21, 1969   H. LUTZ   3,473,841
SAFETY FRAMES IN TRACTORS
Filed June 29, 1967   3 Sheets-Sheet 1

Hans Lutz
INVENTOR.

BY Karl G. Ross
Attorney

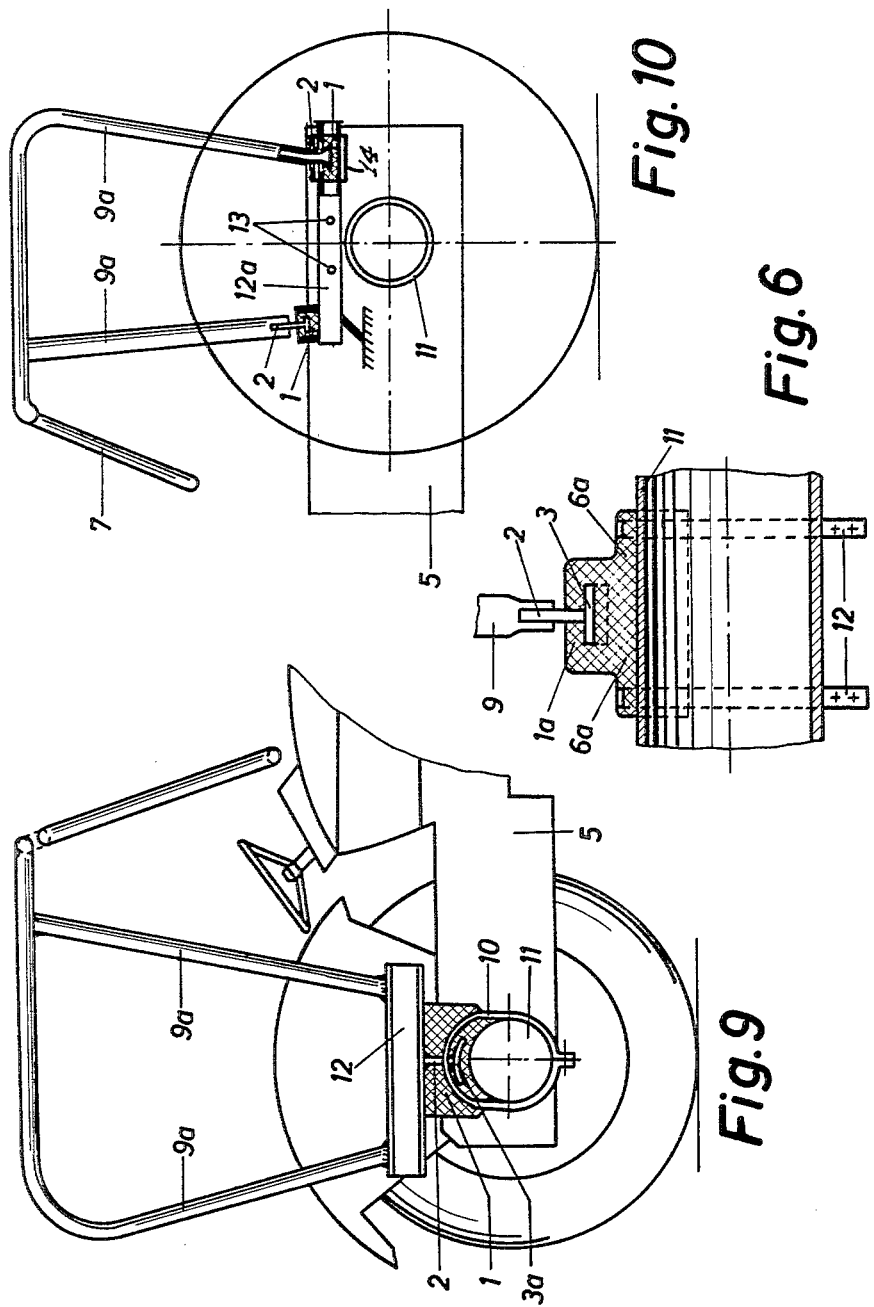

Hans Lutz
INVENTOR.

BY Karl F. Ross
Attorney

United States Patent Office 3,473,841
Patented Oct. 21, 1969

3,473,841
SAFETY FRAMES IN TRACTORS
Hans Lutz, Bahnhofstrasse 4, Brannenburg, Germany
Filed June 29, 1967, Ser. No. 649,967
Int. Cl. B62d 25/06; B60j 7/24
U.S. Cl. 296—102                              4 Claims

ABSTRACT OF THE DISCLOSURE

Safety frame supporting a canopy of a tractor, the frame members being anchored to the tractor body by metallic extensions with enlarged bases embedded in a cushion of rubber or the like to which these extensions are bonded by vulcanization, the cushion being strapped to an axle housing or otherwise secured to the tractor body.

---

The invention relates to support means for a stable safety frame or cab affording protection to the driver of a tractor.

When working on steep gradients, particularly in the performance of agricultural work, a tractor is exposed to the risk of overturning and any such accident may cause serious and even fatal injury to the driver. For the purpose of eliminating or at least minimising this risk it has been proposed to protect the driver's seat by means of a strong safety frame or cage which spans the driver's seat and which is sufficiently rugged not to buckle or collapse when suddenly loaded by the full weight of the tractor. It has also been proposed to provide such a rugged frame for supporting a cab or canopy enclosing the driver's seat. In such arrangements suitable supporting surfaces on both sides of the tractor body are tapped for the purpose of bolting the struts of the frame to the tractor or metal plates may first be bolted to the tractor and supporting members welded to the plate, the frame itself being welded or bolted to said supporting members. In such an arrangement the metal bearing plates must be adapted in shape to the contours of the tractor body. Supporting members attached to said plates or directly to the tractor body must also be shaped to adapt them to the contours of the body of the tractor. This involves providing the supporting members with arched configurations which must be strong enough to withstand any impact or strain which may arise when the tractor overturns to prevent collapse of the safety frame.

This naturally calls for the use of particularly robust and strong tubular members or sections for the constructions of the frame and of its supports.

It is therefore the primary object of the present invention to provide support means for such a safety frame which are capable of absorbing the heavy jolts and impacts that may arise in such circumstances, particularly when the tractor overturns, and which facilitate applying the support means to any desired type of tractor.

For solving this problem the invention provides support means for a stable safety frame to protect the driver of a tractor, in the form of compound elements comprising resilient members, particularly rubber members, adapted to be bolted or tied to suitable parts of the body or the rear axle housing of the tractor and associated with one or more projecting metal parts embedded in or bonded to said resilient members by vulcanization for affixation thereto either directly or through intermediate elements of the safety frame or its members. The resilient location of the metal parts, to which the frame may be either directly affixed or attached for instance by welding with the interposition of angle members or arches, permits the frame structure to be very much lighter than in conventional forms of construction. Above all the risk of fracture of the frame can thus be eliminated since the impact when the tractor overturns is elastically and resiliently absorbed by the compound rubber and metal elements. Furthermore, the proposed support means in the form of compound rubber and metal elements may be readily and conveniently adapted to any existing shape of the tractor body, since rugged metal bearing plates need not be specially shaped or machined, as is the case in known forms of construction. However, the compound rubber and metal element according to the invention, in which the place of the rubber may also be taken by a suitable resilient plastic material, may be so designed that one of its surfaces only approximately conforms with the cooperating surface of the tractor body to which it is to be attached, the compound element being then so deformed by means of attachments, such as straps or the like which may embrace flanges, fins or the like of the rubber member, that the bearing surface of the compound element is pulled tightly against the cooperating surface of the tractor body.

In order that the nature of the invention may be more readily understood, embodiments of the proposed support means for a safety frame for a driver's seat will be hereinafter more particularly described with reference to the accompanying drawing in which:

FIG. 6 is a schematic fragmentary axial section of one half of the rear axle housing carrying a modified resilient support means;

FIG. 9 shows a modified embodiment of the support means and construction of the safety frame, differing from those of FIGS. 5 to 7;

FIG. 10 shows yet another embodiment of a resilient support means for a safety frame on a tractor.

Figure 1:
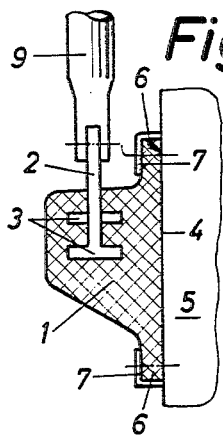
FIGS. 1 and 2 are a vertical section and a plan view of a resilient support means attached to the tractor body for supporting the safety frame.
Figure 2:
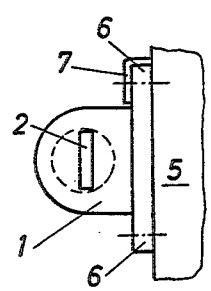

In the embodiment illustrated in FIGS. 1 and 2 the support means for a frame to protect the driver of a tractor comprises an elastically resilient member or cushion 1, preferably consisting of rubber, enveloping a metal part 2 with anchoring projections or bases 3 bonded to the rubber by vulcanization. Alternatively this part 2 may be bonded to a surface of the resilient member 1 by vulcanization. The resultant compound rubber and metal element 1, 2 has a surface 4 which conforms with a suitable cooperating surface of the tractor body 5 to which it is secured by screws engaging tappings in the surface of the tractor body. The compound rubber and metal element may be formed with projecting fins 6 or flanges in which metal reinforcements are embedded and bonded by vulcanization or to which metal fittings such as angle sections 7 are externally applied or bonded by vulcanization. The fins 6 as well as the fittings 7 are provided with holes for bolting the compound rubber and metal element to the body of the tractor. In appropriate cases a part of the compound rubber and metal element, such as the said fins 6, may also be attached to the body of the tractor by straps or like means, in which case the bearing surface 4 need only approximately conform with the cooperating tractor surface, since the straps will pull the compound rubber and metal element tightly against the tractor surface. The straps may themselves pass through the compound rubber and metal element and may be vulcanized into the same, provided this is done without impairing the elastic flexibility of the compound rubber and metal element itself.

Figure 3:
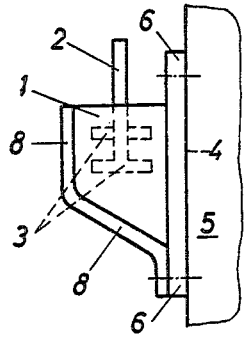
FIGS. 3 and 4 are an elevation and a plan view of a modification of the embodiment according to FIGS. 1 and 2.
Figure 4:
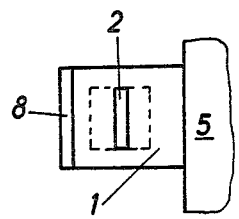

In a modification of the embodiment according to FIGS. 1 and 2 an appropriate steel section 8 may be provided, as shown in FIGS. 3 and 4, on the outside of the compound rubber and metal element 1 in which the supporting metal part 2 is embedded and bonded by vulcanization, said steel section and the fin 6 being jointly screwed to the tractor body 5 in such manner that the steel section 8 bears loosely against the rubber member 1 although it may likewise be bonded thereto by vulcanization.

In the embodiments according to FIGS. 1 to 4, the bottom ends 9 of the safety frame are bolted or welded to the part 2 which is vulcanized into the rubber, and if desired any suitably angled or arched intermediate members may be interposed between the metal part 2 of the compound element and the bottom ends of the members of the safety frame 9.

Figure 5:
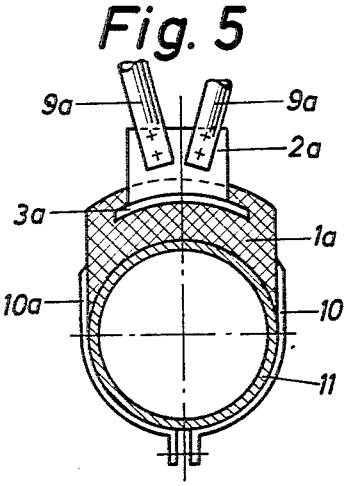
FIG. 5 is a schematic vertical section of a resilient support means for a safety frame mounted on the rear axle housing of the tractor.

It is generally preferred flexibly to attach the front end members of the safety frame to the body of the tractor in the manner shown in FIGS. 1 to 4 and to support the rear portion of the safety frame, likewise resiliently, from the rear axle housing of the tractor. Alternatively, the safety frame could be resiliently mounted exclusively on the rear axle housing. An arrangement of this kind, which could incidentally also be used in conjunction with the arrangements illustrated in FIGS. 1 to 4, is shown in FIG. 5. The resilient member 1a, preferably a rubber member, in this embodiment is again provided with a supporting metal part 2a formed with a baseplate 3a embedded and vulcanized into the rubber. The metal part may be a plate 2a to which the bottom ends 9a of the members of a safety frame can be bolted or welded. Straps 10, 10a are vulcanized to the sides of the rubber member and parts of the straps may be embedded in the rubber. These straps 10 embrace the rear axle housing 11 which is only schematically shown and are tightened by means of a screw. The surface of the rubber member which only roughly conforms with the periphery of the axle housing 11 is thus firmly pulled into contact therewith until it tightly embraces the housing as shown. However, as shown in FIG. 6, the compound rubber and metal element 1a may be formed with lateral flanges 6a in such manner that straps 12 can be placed over these flanges and around the axle housing to pull the rubber member 1 tightly onto the circumference of the casing. Naturally, in this arrangement the flanges 6a may likewise be reinforced by vulcanizing metal plates onto or into the same to ensure that contact between the flanges and the axle housing is not resilient, without affecting the resilience of the metal and rubber supporting element itself.

Figure 8:
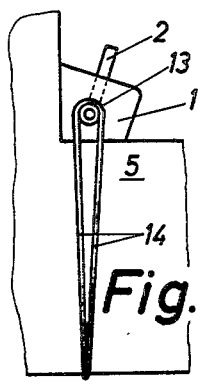
FIG. 8 shows a modification of the front end support means of the frame in FIG. 7, likewise in side elevation.
Figure 7:
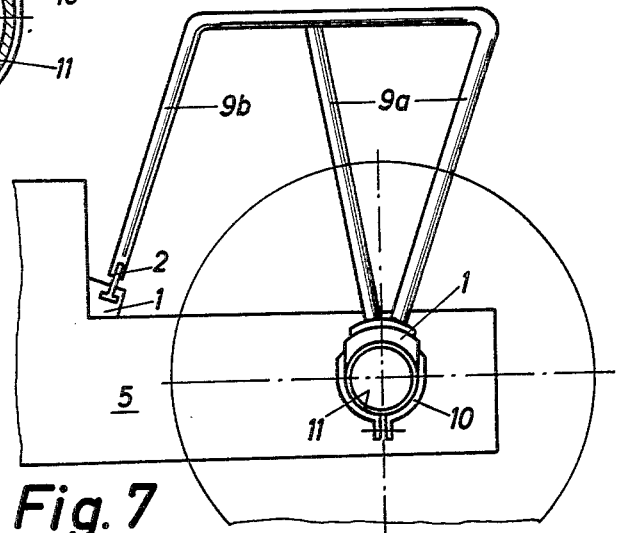
FIG. 7 is a schematic side elevation of a safety frame above the driver's seat of a tractor.

FIG. 7 is a side-elevational view illustrating the manner in which the safety frame is supported with the aid of the assembly shown in FIG. 5. Above the driver's seat the frame extends from one side of the axle housing 11 to the other and the frame members 9a are also interconnected at the top. If in such an arrangement it is desirable or necessary also to support the forward end of the safety frame, supplementary members 9b may be loosely and resiliently attached to the body of the tractor as indicated in FIG. 7, the joint or support means being again constituted by a compound rubber and metal element 1, 2. If it is desired to secure this front-end rubber and metal supporting element firmly to the tractor body, straps may again be vulcanized into the rubber member 1. These may be placed around the tractor body and tightened or, as shown in FIG. 8, laterally projecting pins 13 may be vulcanized into the rubber member 1 alongside the metal connecting part 2 and tension wires 14 may be placed over the pins and around the tractor body 5.

The embodiment according to FIGS. 5 and 6 may also be modified as shown in FIG. 9, where the anchoring plate 3a which is vulcanized into the body of the rubber member 1 is attached by a welded web to a lateral beam 12 extending skew to the wheel axle in the general direction of travel, for instance in the form of a channel section, the members 9a of the safety frame being attached to the cross beam by bolts or welds or in some other way. The straps 10 which are likewise vulcanized into the rubber so that they do not make contact with the anchorage plate 3a, nevertheless permit the compound supporting element to be tightly secured to the rear axle housing.

If the tractor body is provided with lateral projections in the neighborhood of the rear axle housing, for instance for bolting to fenders or other accessories, an arrangement may be adopted such as that shown in FIG. 10 in which a lateral beam 12a is bolted to these projections at 13, the cross beam being provided near its ends with compound rubber and metal elements 1, 2 similar in construction to those described with reference to FIGS. 1 to 4. The compound rubber and metal elements may be vulcanized to the cross beam 12a or inserted into an open casing which is rigidly affixed to the cross beam. Naturally, the casing for the reception of the rubber and metal element may be affixed to the side of the cross beam as indicated on the right-hand side in FIG. 10. Finally, the beam 12a may be additionally braced against the tractor body 5 by a strut 14.

Figure 12:
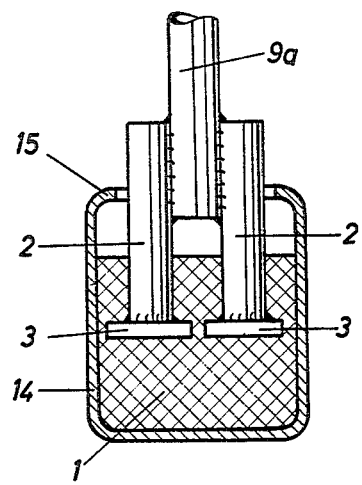
Figure 11:
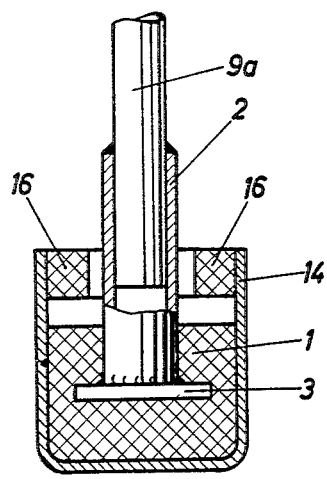

The resilient member 1 with the embedded and vulcanized anchoring projections 3 has been shown inserted in FIG. 10 into an upwardly open metallic casing 14; the resilient member is also proportioned in all other embodiments so that it will absorb elastically the impacts acting upon the safety frame whenever the tractor overturns. The casing 14 has been bent over at its upper rim to form lips 15 confronting the struts 2 with lateral clearance, as shown in FIG. 12, or there may be provided at the upper rim a pair of resilient inner buffers 16 as shown in FIG. 11. These lips 15 or buffers 16 serve as abutments which limit the relative lateral excursions of the struts 2 if the safety frame is stressed by lateral forces during overturning of the tractor.

Figure 13:
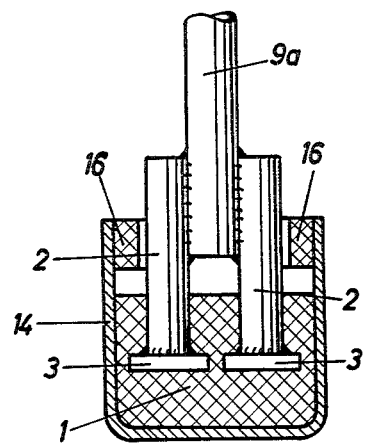

In the embodiments of FIGS. 12 and 13 the members 9a of the safety frame each have been provided with two welded struts 2 and anchoring parts 3 and these latter have been vulcanised into the resilient member 1. The assemblies according to FIGS. 11–13 may also be fixed at the sides of the tractor or on the rear axle housing.

Figure 14:
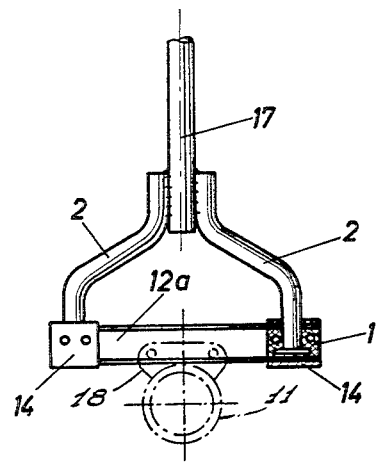
FIGS. 11–14 show further embodiment of a resilient support means for a safety frame on a tractor.

In the embodiments of FIGS. 12 and 13 the two upright parts 9a of the safety frame may form part of a stable safety arch, but then a further frame will be necessary for the hood. Such a stable safety arch 17 may be supported, as shown in FIG. 14, essentially according to the embodiment of FIG. 10. FIG. 14 further shows a bracket 18 serving to mount the lateral supporting member 12a on the axle housing 11.

What I claim is:

1. In a tractor having a body and an axle housing on said body centered on a wheel axis, the combination therewith of a longitudinally extending beam adjacent said axle housing, said beam being mounted on the side of said body and skew to said axis, a canopy-supporting frame, and mounting means securing parts of said frame to opposite ends of said beam, said mounting means including a pair of resilient cushions interposed between said opposite ends and said parts.

2. The combination defined in claim 1 wherein said mounting means further include upwardly open casings for said cushions, said parts terminating in struts extending with lateral clearance from above into said casings and penetrating said cushions in vulcanization-bonded relationship therewith.

3. The combination defined in claim 2 wherein said casings are provided with abutments spacedly flanking said struts for limiting said lateral clearance.

4. In a tractor having a body and lateral support means on said body, the combination therewith of a canopy-supporting frame having a lateral strut and mounting means securing said strut to said support means, said mounting means including an upwardly open casing resting on said support means and a resilient cushion in said casing, said strut extending with limited lateral clearance from above into said casing and penetrating said cushion in vulcanization-bonded relationship therewith.

References Cited

UNITED STATES PATENTS

| | | | |
|---|---|---|---|
| 3,036,858 | 5/1962 | Fingerut | 296—102 |
| 3,203,728 | 8/1965 | Wood | 296—102 |
| 2,448,281 | 8/1948 | Saurer | 248—10 |

LEO FRIAGLIA, Primary Examiner

ROBERT R. SONG, Assistant Examiner

U.S. Cl. X.R.

280—150